Oct. 4, 1927.
F. A. KRIEGER
AGRICULTURAL MACHINERY
Filed June 18, 1924
1,644,596
2 Sheets-Sheet 1
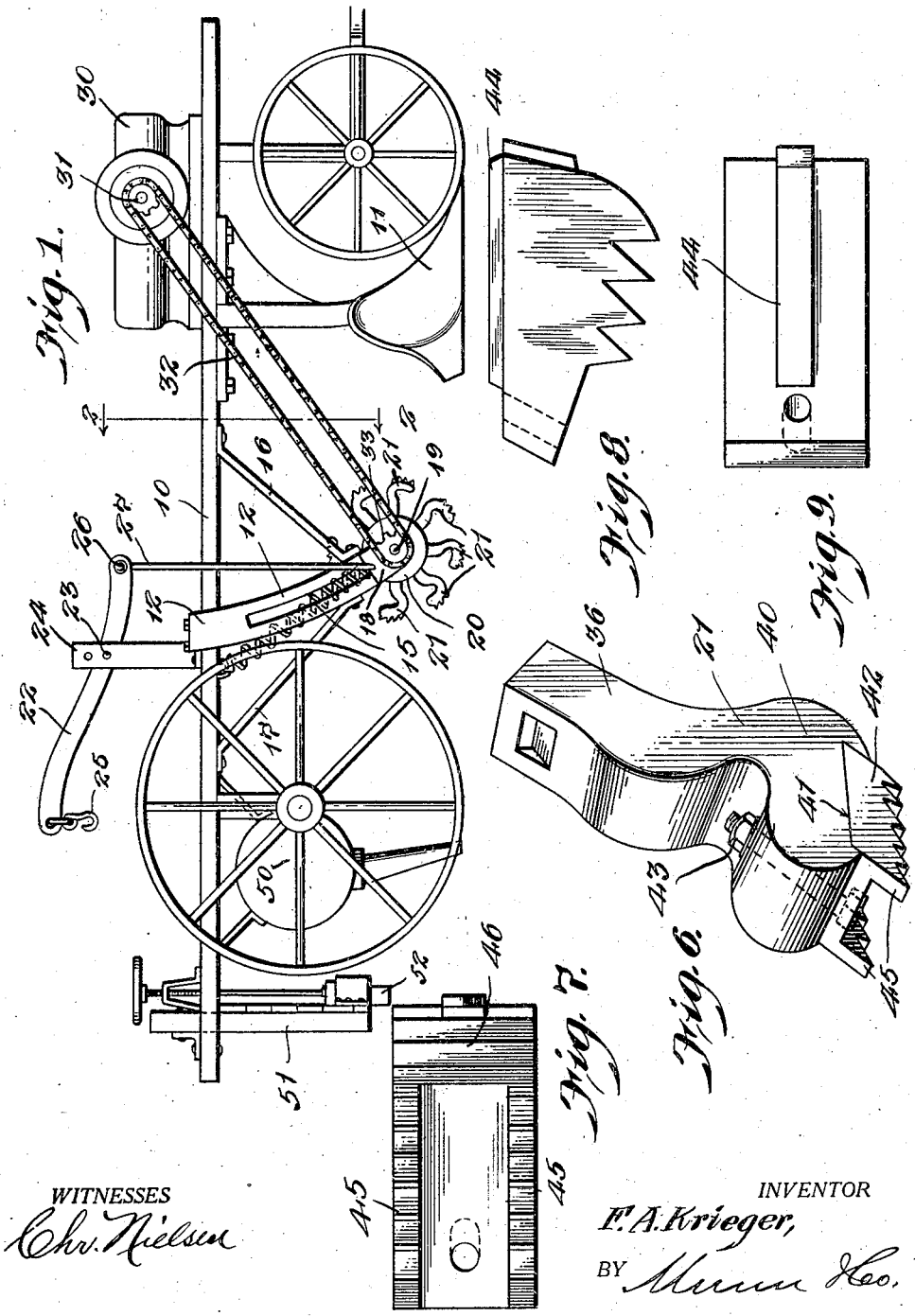
WITNESSES
Chr. Nielsen
INVENTOR
F. A. Krieger,
BY
ATTORNEYS

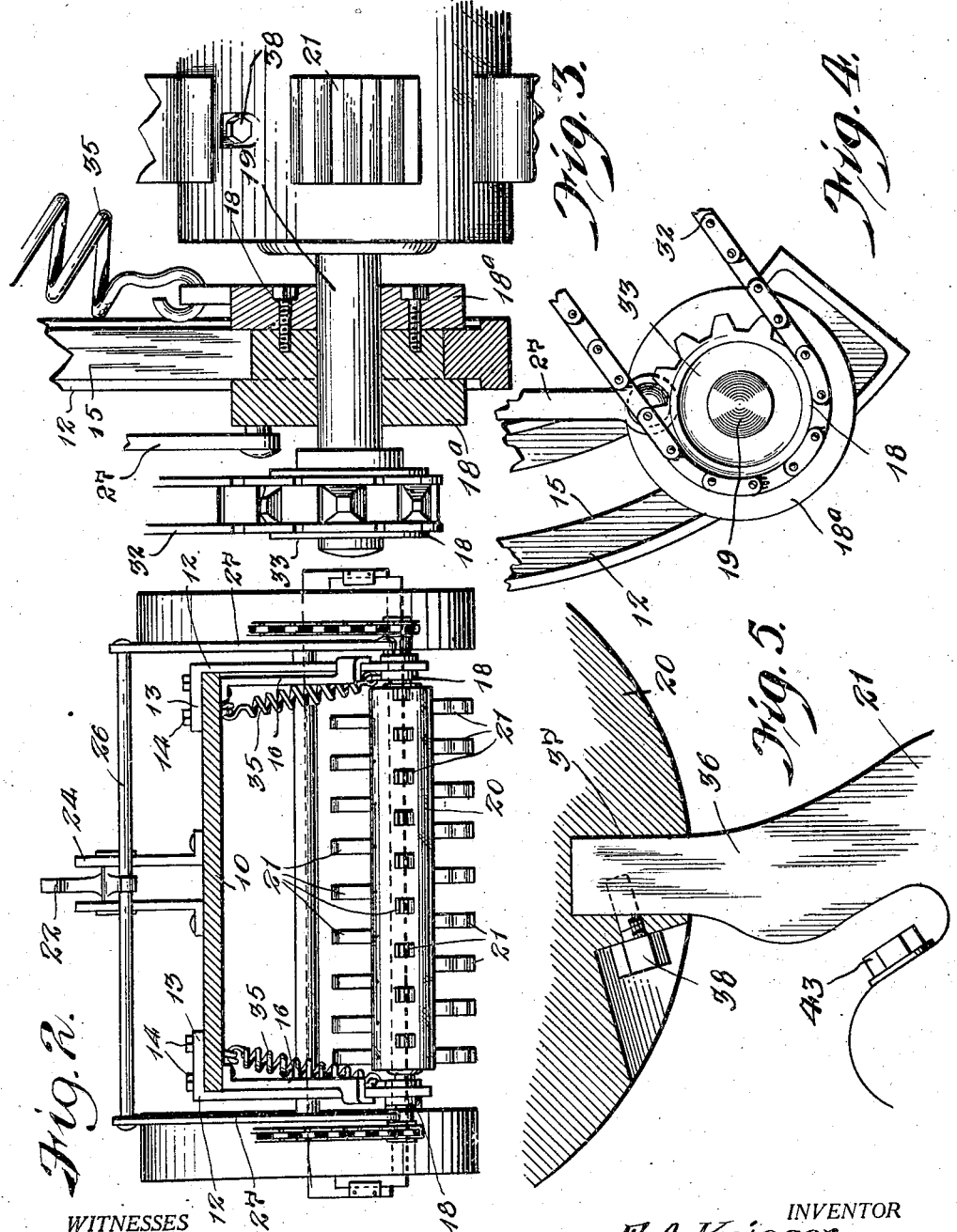

Patented Oct. 4, 1927.

1,644,596

UNITED STATES PATENT OFFICE.

FREDERICK AUGUST KRIEGER, OF LIVINGSTON, MONTANA.

AGRICULTURAL MACHINERY.

Application filed June 18, 1924. Serial No. 720,821.

This invention relates in general to agricultural machinery, and although primarily designed for use as a cultivator is also intended to be employed for plowing the ground, planting the seed and levelling the ground after the seed has been deposited. The cultivating agencies may also be employed as a weed eradicator.

The object of the invention is to provide a machine of this character and having these capacities and advantages, and which is of simple and durable construction, reliable in operation, easily and readily controlled and adapted to be manufactured at a comparatively slight expense from materials and by means of facilities ordinarily available.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view in side elevation, showing one embodiment of the invention;

Figure 2 is a view in vertical section on line 2—2 of Figure 1, and looking in the direction of the arrows;

Figure 3 is an enlarged view in section, showing the manner in which the shaft of the cultivating cylinder is mounted in the arms of the carrier;

Figure 4 is a fragmentary view in elevation of the lower end of the carrier arm and the adjacent parts of the drive for the cultivating cylinder;

Figure 5 is a fragmentary view, partly in elevation and partly in section, showing the manner of mounting the cultivating shoes or elements in the cultivating cylinder;

Figure 6 is a detail perspective view of one of the cultivating shoes;

Figure 7 is a bottom plan view of the ground engaging element of the cultivating shoe;

Figure 8 is a view thereof in side elevation; and

Figure 9 is a top plan view thereof.

Referring to the drawings, the numeral 10 designates a wheeled platform which is adapted to be drawn across the field by a tractor or other suitable means. At the forward end of the platform plows 11 are supported.

Behind the plows 11 and approximately midway of the platform 10 the cultivating means is arranged and this means includes a carrier consisting of a pair of carrier arms 12 disposed on the opposite sides of the platform and having inturned portions 13 at their upper ends bolted as at 14 to the platform. The main portions of the arms 12 are curved or of arcuate formation, and in these main portions arcuate slots 15 are formed. Braces 16 and 17 are provided between each arm 12 and the platform 10.

In each slot 15 a bearing block 18 is mounted for sliding adjustment, and in these bearing blocks a shaft 19 is rotatably mounted, the shaft extending transverse between the two alined bearing blocks 18. The bearing blocks 18 have flanges $18^a$ which prevent them from being displaced endwise from the carrier arms. A cultivating cylinder 20 is fixed to the shaft 19 and carries a plurality of cultivating shoes 21. Any desired number of cultivating shoes may be provided. The degree and character of the cultivating action may be controlled by shifting the blocks 18 in the slots 15 so as to move the shaft 19 and consequently the cultivating cylinder 20 toward or away from the ground. For this purpose a control lever 22 is fulcrumed, as at 23 on a pair of standards 24. One end of the lever 22 is provided with a hook 25 and adapted to coact with an eye, a chain or similar element provided on the platform 10 to hold the lever in position to maintain the cultivating cylinder elevated. The other end of the lever 22 is connected to a transverse rod 26 from the ends of which connecting rods 27 depend. The upper ends of the connecting rods 27 are pivotally connected to the transverse rod 26, and the lower ends of these rods 27 are pivotally connected to the bearing blocks 18.

Means is provided for driving the shaft 19 in any of its adjustments, and this means preferably comprises a gasoline engine 30 mounted on the platform and having sprocket wheels 31 fixed to the ends of its crank shaft. Sprocket chains 32 are trained over the sprocket wheels 31 and over sprocket wheels 33 fixed to the projecting ends of the shaft 19. The arrangement is such that the shaft 19 swings in an arc struck from the crank shaft of the engine as its center so that the drive may be effected in any adjustment of the shaft 19. It is to be understood that, if desired, belts and pulleys may be employed in lieu of sprocket wheels and chains.

If desired the weight of the cultivating cylinder, the cultivating shoes, the shaft 19, and the blocks 18 may be counterbalanced to some degree by means of a retractile coil spring 35 connected to the platform and to the bearing blocks.

The cultivating shoes 21 are provided with shanks 36 fitted in slots 37 in the cultivating cylinder 20 and held in position in said slots by means of set screws 38. The shoes 21 may be arranged in transverse rows on the cylinder 20 with the shoes of one row staggered with respect to the shoes of the other.

Each shoe 21 has a head 40 integrally formed with the lower end of its shank 36 and in the under side of each head 40 a transverse recess 41 is provided. In this recess 41 a ground engaging or cutting element 42 is seated and is held in position by means of a bolt and nut 43 and a rib 44, the bolt extending through bolt holes provided in the element 42 and in the element 40, and the rib 44 being received in a slot provided therefor in the head 40. Of course the slot which accommodates the rib 44 opens into a recess 41. The element 42 preferably includes a pair of toothed blades 45 at its forward end and a plurality of teeth 46 at its rearward end. The toothed blades 45 extend parallel to each other and along the sides of the shoe while the teeth 46 are relatively large, extend transversely, and are disposed rearwardly of the toothed blades 45.

A seeder 50 of any conventional construction is provided rearwardly of the cultivating means.

Behind the seeder a combined levelling device and back stop 51 is provided. The combined levelling device and back stop 51 includes a suitable framing and planking to provide a vertically extending wall having a transverse extent which carries it slightly beyond the sides of the platform. A vertically adjustable panel or scraper blade 52 is provided in the combined levelling device and back stops. With this arrangement the dirt thrown back by the cultivating shoes is precipitated to the ground and also distributed and leveled.

With this arrangement plowing, cultivating, seeding and levelling may be carried out with the same machine. The cultivating action is very thorough and effective, and the character of the same may be regulated to produce the desired results. The seeder may be omitted or removed when desired. Moreover where the soil is not too heavy and hard the plows 11 may also be omitted and the cultivator depended on to work the soil.

I claim:

1. A cultivating shoe including a head having a transverse recess, and a ground-engaging element secured in the recess and having toothed cutting blades, said head having a plurality of teeth extending transversely thereof behind the blades.

2. A cultivating shoe including a head, a ground-engaging element secured to the head and having toothed cutting blades, said head having teeth rearwardly of said blades.

FREDERICK AUGUST KRIEGER.